(12) United States Patent
McGrew et al.

(10) Patent No.: US 12,423,441 B2
(45) Date of Patent: Sep. 23, 2025

(54) METHOD FOR USING GENERATIVE LARGE LANGUAGE MODELS (LLM) FOR CYBERSECURITY DECEPTION AND HONEYPOTS

(71) Applicant: Cisco Technology, Inc., San Jose, CA (US)

(72) Inventors: David Arthur McGrew, Poolesville, MD (US); Hugo Mike Latapie, Long Beach, CA (US); Blake Anderson, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 18/393,487

(22) Filed: Dec. 21, 2023

(65) Prior Publication Data

US 2024/0333765 A1 Oct. 3, 2024

Related U.S. Application Data

(60) Provisional application No. 63/493,552, filed on Mar. 31, 2023.

(51) Int. Cl.
| | |
|---|---|
| *H04L 9/40* | (2022.01) |
| *G06F 11/34* | (2006.01) |
| *G06F 16/334* | (2025.01) |
| *G06F 16/34* | (2019.01) |
| *G06F 16/901* | (2019.01) |

(Continued)

(52) U.S. Cl.
CPC ...... *H04L 63/1433* (2013.01); *G06F 11/3476* (2013.01); *G06F 16/334* (2019.01); *G06F 16/345* (2019.01); *G06F 16/9024* (2019.01); *G06F 21/31* (2013.01); *G06F 21/552* (2013.01); *G06F 21/563* (2013.01); *G06F 21/577* (2013.01); *H04L 63/1425* (2013.01);

(Continued)

(58) Field of Classification Search
None
See application file for complete search history.

(56) References Cited

U.S. PATENT DOCUMENTS

| | | | | |
|---|---|---|---|---|
| 10,320,841 B1 * | 6/2019 | Allen | ...................... | G06N 20/00 |
| 10,379,995 B1 * | 8/2019 | Walters | .................... | G06N 5/04 |

(Continued)

FOREIGN PATENT DOCUMENTS

| | | |
|---|---|---|
| CN | 114363093 | 4/2022 |
| CN | 115987610 | 4/2023 |

*Primary Examiner* — Kaveh Abrishamkar
(74) *Attorney, Agent, or Firm* — Polsinelli P.C.

(57) ABSTRACT

In one aspect, a method for enhancing cybersecurity using Large Language Model (LLM)-generated honeypot schemes, the method includes generating a plurality of deceptive information using an LLM, configured to attract and engage potential attackers, where the plurality of deceptive information includes one or more characteristics referencing vulnerabilities of a network, continuously monitoring for interactions initiated by an interacting party with one or more components of the generated deceptive information, where the interaction is identified as a potential threat to the network, in response to detection of an interaction identified as a potential threat, extracting interaction data associated with the interacting party retrieved during the interaction, and retraining the LLM with the interaction data to create more effective honeypots.

20 Claims, 7 Drawing Sheets

(51) Int. Cl.
  *G06F 21/31* (2013.01)
  *G06F 21/55* (2013.01)
  *G06F 21/56* (2013.01)
  *G06F 21/57* (2013.01)

(52) U.S. Cl.
  CPC ........ *H04L 63/145* (2013.01); *H04L 63/1483* (2013.01); *H04L 63/1491* (2013.01)

(56) References Cited

U.S. PATENT DOCUMENTS

| | | | |
|---|---|---|---|
| 11,050,787 B1* | 6/2021 | Sharifi Mehr | G06F 9/45558 |
| 11,057,429 B1 | 7/2021 | Sellers | |
| 2018/0262529 A1* | 9/2018 | Allen | G06F 21/566 |
| 2021/0067553 A1 | 3/2021 | Ries et al. | |
| 2022/0053022 A1 | 2/2022 | Wu et al. | |
| 2022/0103582 A1* | 3/2022 | Kidney | H04L 63/1425 |

* cited by examiner

METHOD FOR USING GENERATIVE LARGE LANGUAGE MODELS (LLM) FOR CYBERSECURITY DECEPTION AND HONEYPOTS

CROSS-REFERENCE TO RELATED APPLICATIONS

This application claims priority to U.S. Provisional Patent Application No. 63/493,552, filed Mar. 31, 2023, the full disclosure of which is incorporated herein by reference in its entirety.

FIELD OF THE TECHNOLOGY

The field of technology for this patent application relates to cybersecurity tools for the detection of behavioral characteristics associated with cybersecurity attacks. Specifically, the proposed technology uses LLM to draw in potential attackers with false documents and accounts using honeypot schemes that generate lifelike deceptions.

BACKGROUND

An increase in malicious attacks on networks gives rise to various challenges to ensure secure and effective communication between devices in a network. With increasing numbers of devices and access points on the network, comprehensive security strategies benefit from defenses at multiple layers of depth, with security layered across the network, the server, and the endpoints. Intrusion prevention systems can monitor a network for malicious or unwanted activity and can react, in real time, to block, deny, or prevent those activities.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
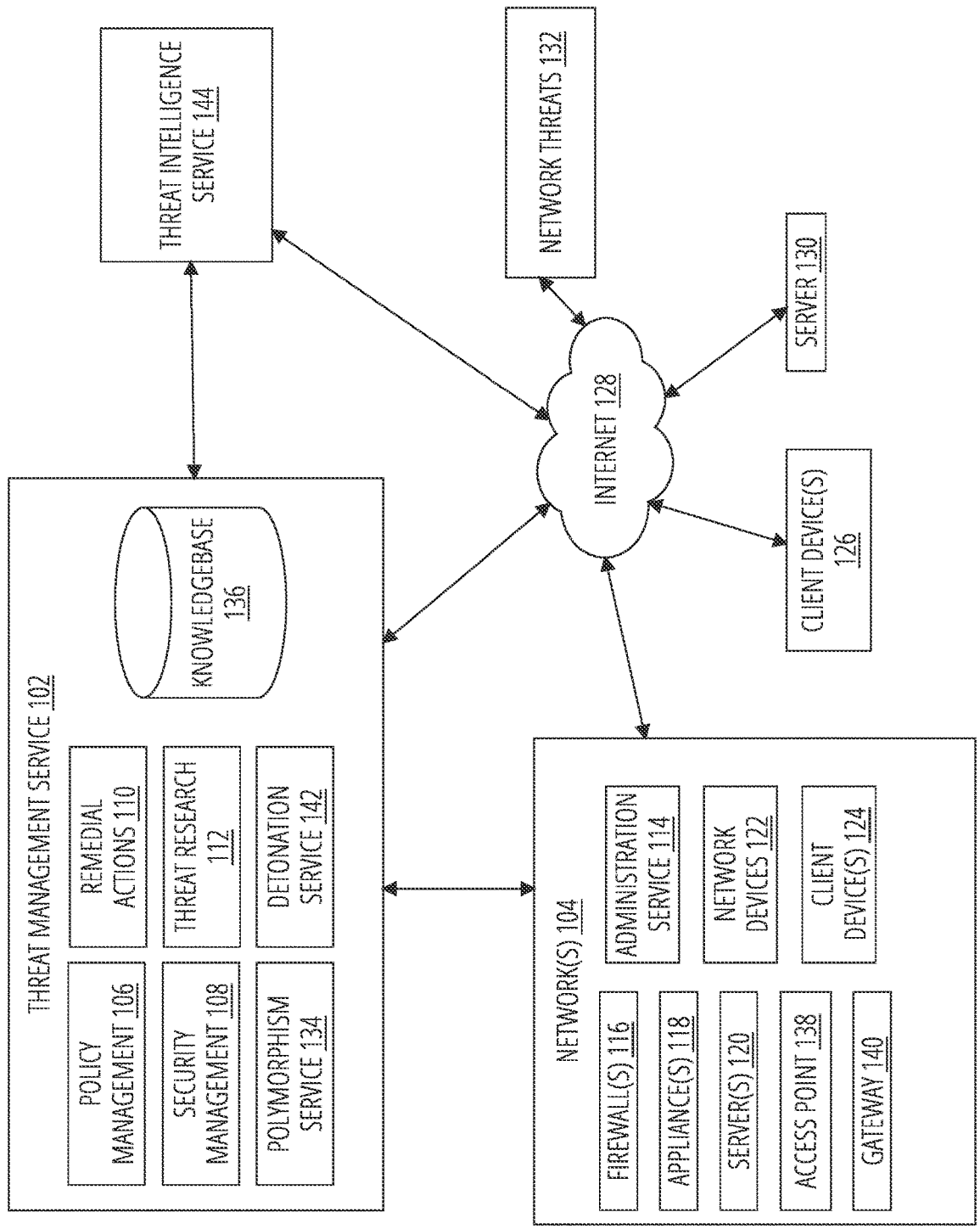
FIG. 1 illustrates an example threat management system in accordance with some embodiments of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Generative LLM are important tools for preventing malware infections and performing threat management. These models can be used to detect malicious activity on a network by analyzing large volumes of data in real-time. By leveraging the power of machine learning, these models can identify anomalies or suspicious patterns that may indicate the presence of malware. In addition, they can also be used to detect known malicious code in files or network traffic. By using LLMs, better visibility can be gained into wireless network systems to quickly detect and remove any threats in a preventative manner prior to subsequent damage to the network, network devices and to assist with maintaining the security of the network by protecting sensitive data from falling into the wrong hands.

The present disclosure is directed toward LLM-generated honeypot schemes, serving as proactive defense mechanisms that involve the generation of misleading documents, user accounts, and users. This approach is designed to proactively lure potential attackers, rather than relying solely on passive defense, where actual users' vulnerabilities may be exploited. Within these honeypot systems, the counterfeit documents encompass fabricated HTTP requests and responses, designed to entice and engage attackers before they can target genuine users. This innovative proactive strategy not only enhances security but also allows for the early identification of malicious intent and threat actors.

Through the implementation of LLM-generated honeypot schemes, enterprises are able to detect and thwart potential threats and threat actors before they can exploit vulnerabilities in real users' systems. By doing so, companies not only fortify their security measures but also gain a significant advantage in staying ahead of emerging cyber threats.

Honeypots serve as valuable tools for enhancing security awareness within an organization. They offer critical insights into the tactics, techniques, and procedures used by attackers, providing security teams with a deeper understanding of potential vulnerabilities. With this knowledge, enterprises can fine-tune and optimize their security measures to protect their network and data assets more effectively. By deploying honeypots, the system is able to consume the time and resources of potential attackers, effectively deterring malicious activities and increasing the cost of their pursuits. Honeypots also enable the gathering of counterintelligence data, shedding light on the motives and methods of attackers. This intelligence can be instrumental in identifying trends and adapting security strategies to the evolving landscape of cyber threats.

In one aspect, a method for enhancing cybersecurity using Large Language Model (LLM)-generated honeypot schemes, the method includes generating a plurality of deceptive information using an LLM, configured to attract and engage potential attackers, where the plurality of deceptive information includes one or more characteristics referencing vulnerabilities of a network, continuously monitoring for interactions initiated by an interacting party with one or more components of the generated deceptive information, where the interaction is identified as a potential threat to the network, in response to detection of an interaction identified as a potential threat, extracting interaction data associated with the interacting party retrieved during the interaction, and retraining the LLM with the interaction data to create more effective honeypots.

The method may also include where the LLM-generated honeypot schemes further include a honey pot service configured to prompt the LLM to generate the plurality of deceptive information in accordance with a predetermined script, ensuring consistency with the plurality deceptive information.

The method may also include where the plurality of deceptive information includes one or more fabricated user accounts, files, and administrator accounts configured to engage the potential attackers.

The method may also include further includes tokenization of generated deceptive information to provide realistic HTTP responses in response to interactions initiated by the interacting party.

The method may also include where, in response to the detection of an interaction identified as the potential threat, the method further includes generating one or more remedial measures and policies for the network based on the extracted interaction data, enhancing network security.

The method may also include where the continuously monitoring includes generating one or more predictions of a type of interaction to engage the potential threat associated with the one or more characteristics referencing vulnerabilities of the network.

The method may also include where the continuously monitoring includes generating one or more contextual labels in accordance with contextual data related to the interactions to distinguish and identify threatening interactions from non-threatening interactions, and retraining the LLM with the one or more contextual labels improving an accuracy level of potential threat detection and effectiveness of the honeypots.

The method may also include further includes training the LLM by leveraging malware data stored in a storage, where the LLM references the malware data to identify potential threats in a network.

In one aspect, a network device includes one or more memories having computer-readable instructions stored therein. The network device also includes one or more processors configured to execute the computer-readable instructions to generate a plurality of deceptive information using an LLM, configured to attract and engage potential attackers, where the plurality of deceptive information includes one or more characteristics referencing vulnerabilities of the network, continuously monitor for interactions initiated by an interacting party with one or more components of the generated deceptive information, where the interaction is identified as a potential threat to the network, in response to detection of an interaction identified as a potential threat, extract interaction data associated with the interacting party retrieved during the interaction, and retrain the LLM with the interaction data to create more effective honeypots.

In one aspect, a non-transitory computer-readable storage medium includes computer-readable instructions, which when executed by one or more processors of a network appliance, cause the network appliance to generate a plurality of deceptive information using an LLM, configured to attract and engage potential attackers, where the plurality of deceptive information includes one or more characteristics referencing vulnerabilities of the network, continuously monitor for interactions initiated by an interacting party with one or more components of the generated deceptive information, where the interaction is identified as a potential threat to the network, in response to detection of an interaction identified as a potential threat, extract interaction data associated with the interacting party retrieved during the interaction, and retrain the LLM with the interaction data to create more effective honeypots.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Example Embodiments

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Cybersecurity is becoming increasingly important in today's digital world. With the rise of new technologies and compliance requirements, organizations must stay vigilant to protect themselves against evolving cyber threats. However, traditional security measures are often not enough to keep up with the pace of these threats. This is why it is essential for organizations to identify and address vulnerabilities before they can be exploited by malicious actors. By taking proactive measures to secure their systems, organizations can ensure that they are protected against cyber attacks and can continue to operate safely and securely in the digital landscape.

In the realm of cybersecurity, identifying potential network threats and attackers has become increasingly intricate and challenging. This complexity arises from several factors, including the evolving tactics employed by malicious actors, as well as the growing attack surface created by expanding digital interactions and the use of advanced technologies.

One notable trend is the use of chatbots configured to interact with outside parties through video, audio, and text-based conversations. These chatbots, often designed to mimic human interactions, can be harnessed by cybercriminals to infiltrate networks. By engaging in seemingly genuine conversations, attackers can exploit vulnerabilities within an enterprise's security infrastructure. This tactic has created a new layer of complexity in threat detection, as distinguishing between legitimate interactions and malicious attempts has become increasingly difficult.

To address this challenge, enterprises have adopted various strategies. One common approach is to create honeypots within their network. These honeypots simulate vulnerable accounts, web resources, or email servers that are strategically positioned to attract and trap potential cybercriminals. When attackers interact with these deceptive elements, it enables organizations to detect and analyze their activities, gain insights into their methods, and identify potential vulnerabilities within the network. This strategy not only aids in understanding and countering the evolving tactics of malicious actors but also enhances overall network security.

Furthermore, enterprises frequently employ extra email addresses or email servers with the specific purpose of detecting and mitigating cyber threats. These resources are designed to intercept malicious emails, quarantine suspicious content, and identify potential phishing attempts. By proactively monitoring and filtering incoming communications, organizations can thwart attacks before they can infiltrate the network, safeguarding sensitive data and protecting their infrastructure.

In some examples, LLMs offer a strategic advantage in the creation of proactive honeypots designed to apprehend malicious actors attempting to evade detection. Through the utilization of LLMs, organizations can gain the capability to generate honeypots boasting a diverse array of potential attack vectors and anticipated observables. This extensive range empowers organizations to enhance their preparedness against forthcoming attacks and swiftly identify suspicious activities as they unfold in real-time.

LLM-generated honeypots also possess the capacity to identify malicious actors and their sophisticated techniques, including obfuscation and code injection. Leveraging an artificial honeypot system augmented by LLMs, organizations can attain a heightened level of visibility into the tactics and actions employed by adversaries. This newfound knowledge provided by the analysis of the LLM serves as a valuable resource for reinforcing defenses against prospective attacks, safeguarding the organization's invaluable data and assets in the process.

The proposed technology is related to the utilization of Large Language Model (LLM)-generated honeypot schemes that involve the creation of deceptive documents, accounts, and users designed to lure potential attackers. This proactive approach contrasts with the traditional waiting for attacks on genuine users before intervening on their behalf. Within these honeypot schemes, fabricated documents and accounts are meticulously crafted, encompassing counterfeit HTTP requests and responses, all strategically designed to entice and engage potential adversaries.

In the realm of cybersecurity, deception strategies involve the deliberate dissemination of counterfeit yet convincingly realistic information to potential adversaries. These tactics serve a variety of purposes, including the diversion of an adversary's time and resources, as well as the direct detection of malicious actors through the use of honeypots and honeywords. Deception techniques encompass the creation of fabricated elements such as files, accounts, and servers, all of which can be effectively facilitated with the assistance of GPT-3. For instance, the generation of fictitious files can be accomplished by employing a well-crafted generic file generation prompt, further tailored to specific file types and subject matters. Similarly, the creation of user account information can be achieved through a versatile prompt that can be customized to emulate roles that frequently attract the attention of attackers, such as administrators, executives, and financial leaders.

FIG. 1 illustrates an environment for threat management. Specifically, FIG. 1 depicts a block diagram of a threat management service 102 providing protection to one or more enterprises, networks, locations, users, businesses, etc., against a variety of threats. The threat management service 102 may be used to protect devices (e.g., IoT devices, appliances, services, client devices, or other devices) from computer-generated and human-generated threats.

The threat management service 102 is a malware analysis platform that discovers, identifies, analyzes, and tracks sophisticated threats. It provides an end-to-end workflow from intelligence gathering to multi-vector analysis, threat hunting, and response, resulting in real-time visibility into malicious behavior associated with known and unknown malware.

The threat management service 102 can perform dynamic sandboxing of suspicious files, control flow graph analysis, and memory scanning for detecting malicious activity. The threat management service 102 can accelerate the hunting and finding of threats by providing context for suspicious files, including the behavior of known threats that are tracked across various networks in order to identify associated malware campaigns.

In order to track threats, the threat management service 102 uses a combination of static analysis to examine code and look for telltale indicators that can indicate the presence of malicious code. As well as dynamic analysis to examine how the code behaves when it is executed. This allows the threat management service 102 to accurately identify samples of malware even if they are changed in form but not in function or modified to be difficult for humans or computers to understand (obfuscated).

As explained herein the threat management service 102 further uses detection of both Signature characterization and Behavioral characterizations to identify code as malicious or malware. Signature characterization detection works by scanning for known malware, relying on a database of known threats worldwide and their signatures. Behavioral characterization detection looks at how the code behaves when executed, allowing the threat management service 102 to detect unknown or newly created malware.

During detection, the threat management service 102 will look at the code, metadata, download history, and other information associated with the threat to determine whether or not it is malicious. If it is determined that the code is malicious, then the threat management service 102 will create a report that includes detailed information about the threat, such as its origin, type, risk level, and other related characteristics. Additionally, the report may contain indicators that can help identify the malware's spreading patterns and networks used to host the malicious content. The report can further provide any associated user actions or events occurring before the system detected the threat.

The report and analysis in threat management service 102 can further produce a variety of malware resolutions and solutions, such as blocking malicious URLs, killing malicious processes, quarantining affected files and systems, and disabling malicious services. Additionally, it can provide suggestions on how to improve an organization's security posture or alert administrators to new threats that they should be aware of.

The threat of malware or other compromises may be present at various points within a network 104 such as client devices 124, server 120, gateways 140, IoT devices, appliances 118, firewalls 116, etc. In addition to controlling or stopping malicious code, the threat management service 102 may provide policy management to control devices, applications, or user accounts that might otherwise undermine the productivity and network performance within the network 104.

The threat management service 102 may provide protection to network 104 from computer-based malware, including viruses, spyware, adware, trojans, intrusion, spam, policy abuse, advanced persistent threats, uncontrolled access, and the like. In general, the network 104 may be any networked computer-based infrastructure or the like managed by the threat management service 102, such as an organization, association, institution, or the like, or a cloud-based service. For example, the network 104 may be a corporate, commercial, educational, governmental, or other network, and may include multiple networks, computing resources, and other facilities, may be distributed among more than one geographical locations, and may include an administration service 114, a firewall 116, an appliance 118, a server 120, network devices 122 including access point 138 and a gateway 140, and endpoint devices such as client devices 124 or IoT devices.

The threat management service 102 may include computers, software, or other computing service supporting a plurality of functions, such as one or more of a security management service 108, a policy management service 106, a remedial action service 110, a threat research service 112, and the like. In some embodiments, the threat protection provided by the threat management service 102 may extend beyond the network boundaries of the network 104 to include client devices 124 that have moved into network connectivity not directly associated with or controlled by the network 104. Threats to client facilities may come from a variety of sources, such as network threats 132, physical proximity threats, and the like. Client device 124 may be protected from threats even when the client device 124 is not directly connected to or in association with the network 104, such as when a client device 124 moves in and out of the network 104, for example, when interfacing with an unprotected server 120 through the internet 128.

The threat management service 102 may use or may be included in an integrated system approach to provide the network 104 with protection from a plurality of threats to device resources in a plurality of locations and network configurations. The threat management service 102 may also or instead be deployed as a stand-alone solution for an enterprise. For example, some or all of the threat management service 102 components may be integrated into a server or servers on-premises or at a remote location, for example, in a cloud computing service. For example, some or all of the threat management service 102 components may be integrated into a server 120, firewall 116, gateway 140, appliance 118, or access point 138 within or at the border of the network 104. In some embodiments, the threat management service 102 may be integrated into a product, such as a third-party product (e.g., through an application programming interface), which may be deployed on endpoints, on remote servers, on internal servers or gateways for a network, or some combination of these.

The security management service 108 may include a plurality of elements that provide protection from malware to device resources of the network 104 in a variety of ways, including endpoint security and control, email security and control, web security and control, reputation-based filtering, control of unauthorized users, control of guest and non-compliant computers, and the like. The security management service 108 may also provide protection to one or more device resources of the network 104. The security management service 108 may have the ability to scan client service files for malicious code, remove or quarantine certain applications and files, prevent certain actions, perform remedial actions and perform other security measures. This may include scanning some or all of the files stored on the client service or accessed by the client service on a periodic basis, scanning an application when the application is executed, scanning data (e.g., files or other communication) in transit to or from a device, etc. The scanning of applications and files may be performed to detect known or unknown malicious code or unwanted applications.

The security management service 108 may provide email security and control. The security management service 108 may also or instead provide for web security and control, such as by helping to detect or block viruses, spyware, malware, unwanted applications, and the like, or by helping to control web browsing activity originating from client devices. In some embodiments, the security management service 108 may provide network access control, which may provide control over network connections. In addition, network access control may control access to virtual private networks (VPN) that provide communications networks tunneled through other networks. The security management service 108 may provide host intrusion prevention through behavioral-based analysis of code, which may guard against known or unknown threats by analyzing behavior before or while code executes. Further, or instead, the security management service 108 may provide reputation filtering, which may target or identify sources of code.

In general, the security management service 108 may support overall security of the network 104 using the various techniques described herein, optionally as supplemented by updates of malicious code information and so forth for distribution across the network 104. Information from the security management service 108 may also be sent from the enterprise back to a third party, a vendor, or the like, which may lead to improved performance of the threat management service 102. For example, threat intelligence service 144 can receive information about newly detected threats from sources in addition to the threat management service 102 and can provide intelligence on new and evolving threats.

The policy management service 106 of the threat management service 102 may be configured to take actions, such as to block applications, users, communications, devices, and so on based on determinations made. The policy management service 106 may employ a set of rules or policies that determine network 104 access permissions for one or more of the client devices 124. In some embodiments, a policy database may include a block list, a black list, an allowed list, a white list, or the like, or combinations of the foregoing, that may provide a list of resources internal or external to the network 104 that may or may not be accessed by the client devices 124. The policy management service 106 may also or instead include rule-based filtering of access requests or resource requests, or other suitable techniques for controlling access to resources consistent with a corresponding policy.

As threats are identified and characterized, the threat research service 112 may create updates that may be used to allow the threat management service 102 to detect and remediate malicious software, unwanted applications, configuration and policy changes, and the like. The threat research service 112 may contain threat identification updates, also referred to as definition files and can store these definition files in the knowledgebase 136. A definition file may be a virus identity file that may include definitions of known or potential malicious code. The virus identity definition files may provide information that may identify malicious code within files, applications, or the like. In some embodiments, the definition files can include hash values that can be used to compare potential malicious code against known malicious code. In some embodiments, the definition files can include behavior characterizations, such as graphs of malware behavior. In some embodiments, the threat research service 112 can detonate possible malware to create the behavioral characterizes to be included in the definition files.

The definition files may be accessed by the security management service 108 when scanning files or applications within the client service for the determination of malicious code that may be within the file or application. The definition files include a definition for a neural network or other recognition engine to recognize malware. The threat research service 112 may provide timely updates of definition files information to the knowledgebase 136, network 104, and the like.

In some embodiments, in addition to characterizing detected and known malware in the definition files, the threat research service 112 can utilize a polymorphism service 134 to attempt to improve the ability to recognize polymorphic variants of detected malware. In some embodiments, the polymorphism service 134 can make use of a Generative large language model to create polymorphic variants of malware and determine if the polymorphic variants are detected by the security management service 108. When a polymorphic variant is not detected, the polymorphic variant can be detonated using detonation service 142. The threat research service 112 can store a hash value and any updates to the behavioral characterizations as part of the definitions files to ensure that the polymorphic variant of the malware will be detected if it is ever encountered.

The security management service 108 may be used to scan an outgoing file and verify that the outgoing file is permitted to be transmitted per rules and policies of the network 104. By checking outgoing files, the security management service 108 may be able to discover malicious code infected files that were not detected as incoming files. Additionally, the security management service 108 can generate outgoing files for data loss prevention against data loss prevention policies configured by the policy management service 106.

When a threat or policy violation is detected by the threat management service 102, the threat management service 102 may perform or initiate remedial action through the remedial action service 110. Remedial action may take a variety of forms, such as terminating or modifying an ongoing process or interaction, issuing an alert, sending a warning (e.g., to a client device 124 or to the administration service 114) of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on one or more of the client devices 124, quarantining a related application (or files, processes or the like), terminating the application or device, isolating the application or device, moving a process or application code to a sandbox for evaluation by the detonation service 142, isolating one or more of the client devices 124 to a location or status within the network that restricts network access, blocking a network access port from one or more of the client device 124, reporting the application to the administration service 114, or the like, as well as any combination of the foregoing.

In some embodiments, the threat intelligence service 144 offers intelligence on the latest threats and solutions for prevention. For example, the threat intelligence service 144 provides instructional data to all security devices such as threat management service 102 and provides information to create definition files to identify the latest threat to protect the network from newly detected attacks. The main advantage of the threat intelligence service 144 is the large amount of security network devices that can provide threat intelligence service 144 with data on detected and undetected threats. There can be many security devices across many different networks, enterprises, and vendors that can feed information to the threat intelligence service 144, and therefore threat intelligence service 144 has more data on threats than the threat management service 102. The threat intelligence service 144 collects data from many devices and adds to it all the data collected by partners to analyze vectors of new attacks. The threats are tracked using digital signatures that can be used in the definition files used by the threat management service 102.

One type of signature is a Hash-Based signatures. These hashes are generated through dynamic sandboxing, control flow graph analysis, memory scanning, behavior-based detection, and other methods for identifying malicious code. The threat intelligence service 144 can then provide detailed reports with threat indicators that can help administrators track down malicious code and reduce their risk of infection.

Another type of signature is a Pattern Based Signatures or BASS (Automated Signature Synthesizer). BASS (Automated Signature Synthesizer) is a framework designed to automatically generate antivirus signatures from samples belonging to previously generated malware clusters. It is meant to reduce resource usage by producing more pattern-based signatures as opposed to hash-based signatures. Compared to pattern-based or bytecode-based signatures, hash-based signatures have the disadvantage of only matching a single file per signature. Pattern-based signatures are able to identify a whole cluster of files instead of just a single file.

The threat management service 102 may provide threat protection across the network 104 to devices such as the client devices 124, the servers 120, the administration service 114, the firewall 116, the access point 138, the gateway 140, one or more of the network devices 122 (e.g., hubs and routers), one or more of the appliances 118 (e.g., a threat management appliance), any number of desktop or mobile users, and the like in coordination with an endpoint computer security service. The endpoint computer security service may be an application locally loaded onto any device or computer support component on network 104, either for local security functions or for management by the threat management service 102 or other remote resource, or any combination of these.

The network 104 may include one or more of the servers 120, such as application servers, communications servers, file servers, database servers, proxy servers, mail servers, fax servers, game servers, web servers, and the like. In some embodiments, the threat management service 102 may provide threat protection to servers 120 within the network 104 as load conditions and application changes are made.

The client devices 124 may be protected from threats from within the network 104 using a local or personal firewall, which may be a hardware firewall, software firewall, or a combination thereof, that controls network traffic to and from a client. The local firewall may permit or deny communications based on a security policy.

The interface between the threat management service 102 and the network 104 to embedded endpoint computer security facilities, may include a set of tools that may be the same or different for various implementations and may allow network administrators to implement custom controls. In some embodiments, these controls may include both automatic actions and managed actions. The administration service 114 may configure policy rules that determine interactions.

Interactions between the threat management service 102 and the components of the network 104, including mobile client service extensions of the network 104, may ultimately be connected through the internet 128 or any other network or combination of networks. Security-related or policy-related downloads and upgrades to the network 104 may be passed from the threat management service 102 through to components of the network 104 equipped with the endpoint security management service 108. In turn, the endpoint computer security management services 108 of the enterprise threat management service 102 may upload policy and access requests back across the internet 128 and through to the threat management service 102. The internet 128, however, is also the path through which threats may be transmitted from their source, and one or more of the endpoint computer security facilities may be configured to protect a device outside the network 104 through locally-deployed protective measures and through suitable interactions with the threat management service 102.

Thus, if the mobile client service were to attempt to connect to an unprotected connection point that is not a part of the network 104, the mobile client service, such as one or more of the client devices 124, may be required to request network interactions through the threat management service 102, where contacting the threat management service 102 may be performed prior to any other network action. In embodiments, the endpoint computer security service of the client device 124 may manage actions in unprotected network environments such as when the client service (e.g., the client device 126) is in a secondary location, where the endpoint computer security service may dictate which applications, actions, resources, users, etc. are allowed, blocked, modified, or the like.

Figure 2:
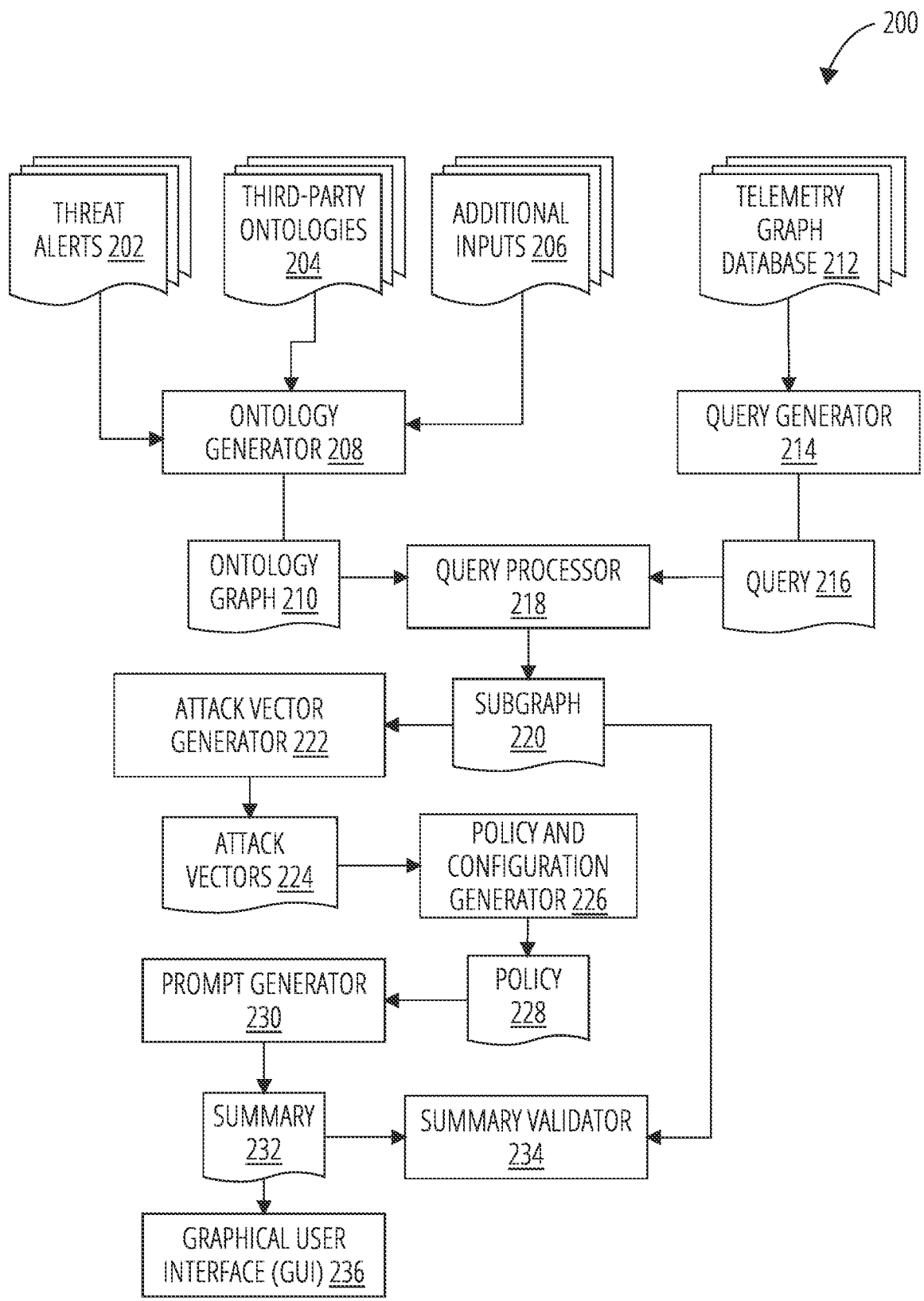
FIG. 2 illustrates a block diagram for an example of a system/device for providing a text summary of the information conveyed by a graph related to a security alert in accordance with some embodiments of the present technology.

FIG. 2 shows an example of an ontology summary system 200 that generates prompts summarizing the security incident giving rise to a threat alert. The ontology summary system 200 has an ontology generator 208 that receives various inputs, including, e.g., a threat alerts 202, a third-party ontologies 204, an additional inputs 206 Based on these inputs, the ontology generator 208 creates an ontology graph 210 that represents various relations between entities of computational instructions that have been executed by a computer/processor. These entities can include files, executable binary, processes, domain names, IP addresses, etc.

The ontology summary system 200 also has a query generator 214 that creates a query 216 based on values from a telemetry graph database 212, which stores graphs/patterns that represent respective malicious behaviors. The query 216 includes a query graph that is compared to various portions of the ontology graph 210 by the query processor 218. This comparison can be based on the topology (e.g., the spatial relations) and content (e.g., values of the vertices/nodes and relations expressed by the edges). When a match is found, the portion of the ontology graph 210 that matches the query graph is returned as subgraph 220.

The remainder of the ontology summary system 200 provides a summary 232 of subgraph 220 and then validates the summary and displays it in a graphical user interface (GUI) 236. First, the attack vector generator 222 converts the subgraph 220 of detected malware identified during penetration testing into a plurality of attack vectors 224. An attack vector is a specific route or method that malicious actors could employ to exploit vulnerabilities within a system, network, application, or device. It serves as a meticulously mapped-out pathway that outlines the sequence of steps an attacker might follow to compromise the intended target. The attack vectors with assist in the identification of potential weaknesses that necessitate mitigation to fortify the defenses of a system. These attack vectors encompass a wide array of techniques that can be categorized into various classes. Network-based attacks, for instance, revolve around leveraging vulnerabilities present in network protocols, services, or devices. Examples of these encompass activities such as network sniffing, distributed denial of service (DDOS) attacks, and the execution of Man-in-the-Middle (MitM) attacks that intercept communications.

In an example, during web-based attacks, penetration testing can detect tactics such as cross-site scripting (XSS), where attackers inject malicious scripts into web pages, and SQL injection, which involves manipulating databases through improperly sanitized inputs. Additionally, common attack vectors that target operating systems can be exposed by exploiting known vulnerabilities to gain unauthorized access. Examples of such threats include privilege escalation attacks buffer overflow attacks, and the execution of arbitrary code.

The attack vectors 224 generated by the attack vector generator 222 can exemplify a category of attack vectors that hinge on manipulating individuals into revealing sensitive information. This grouping encompasses tactics like phishing, which deceives users into disclosing their credentials or other confidential data, and pretexting, a method involving the creation of fictitious scenarios to mislead individuals into sharing information. Thus, the attack vectors 224 can identify vulnerabilities in wireless networks characterize wireless attacks, that can be exploited by attackers, which lead to unauthorized access to Wi-Fi networks or the initiation of various malicious activities.

Using the attack vectors 224, a policy and configuration generator 226 then generates a policy 228 for the prompt generator 230. Policy 228 directs the prompt generator 230 regarding the substance (e.g., the attack vectors 224) and style of the summary 232 to be created by the prompt generator 230. Policy 228 can include a comprehensive list of known attack vectors relevant to the system or software in consideration. This list could contain vulnerabilities, exploits, malware, and social engineering tactics. For each attack vector identified, policy 228 outlines which specific security measures and configurations are necessary to mitigate or prevent any associated attacks. These measures could encompass updated configurations for network appliances in the wireless network, security controls, wireless network configurations, and network access controls.

Additionally, the generated policy 228 could include mappings between attack vectors and corresponding security measures to ensure that appropriate steps are taken for each type of attack vector. The mapping could include configurations that are identified as being most effective against specific attack vectors, and malware that has previously penetrated the security system, allowing for the ability to take proactive steps to protect the network and the associated systems and data from malicious actions and attackers. In some examples, the prompt can identify a plurality of relationships between wireless appliances or nodes within the network. For example, the prompt can express more complex relationships between three or more nodes, thereby making broader connections that can help security analysts more quickly comprehend the information expressed by subgraph 220. Thus, security analysts can more quickly assess the a threat alert stimulated by identified penetration of the network system by malware.

The summary validator 234 checks the summary 232 to determine whether the summary is consistent with the subgraph 220, thereby ensuring that important aspects of the subgraph were not lost or misinterpreted in the translation from the subgraph 220 to the summary 232. For example, a machine learning (ML) method can convert the summary back to a graph that is compared to the subgraph 220 to determine whether features of the subgraph have been preserved.

Additionally, the summary 232 can be displayed in the GUI 236. The GUI 236 can include both the text of the summary 232 and a visual representation of the subgraph 220. The subgraph 220 provides ground truth, and the summary 232 provides a more easily comprehended mechanism for understanding the subgraph 220. According to certain non-limiting examples, a user can select a portion of the text of the summary 232, and in response, the GUI 236 highlights a corresponding portion of the subgraph associated with the selected text. Thus, starting from the text of the summary, a security analyst can quickly find the relevant features in the subgraph 220 that correspond to portions of the text of the summary. Then referring to the corresponding region of the subgraph 220, the security analyst can verify that, for the relevant features, the relations expressed in the text are consistent with the corresponding region of the subgraph 220, thereby confirming a correct understanding of the threat.

Figure 3:
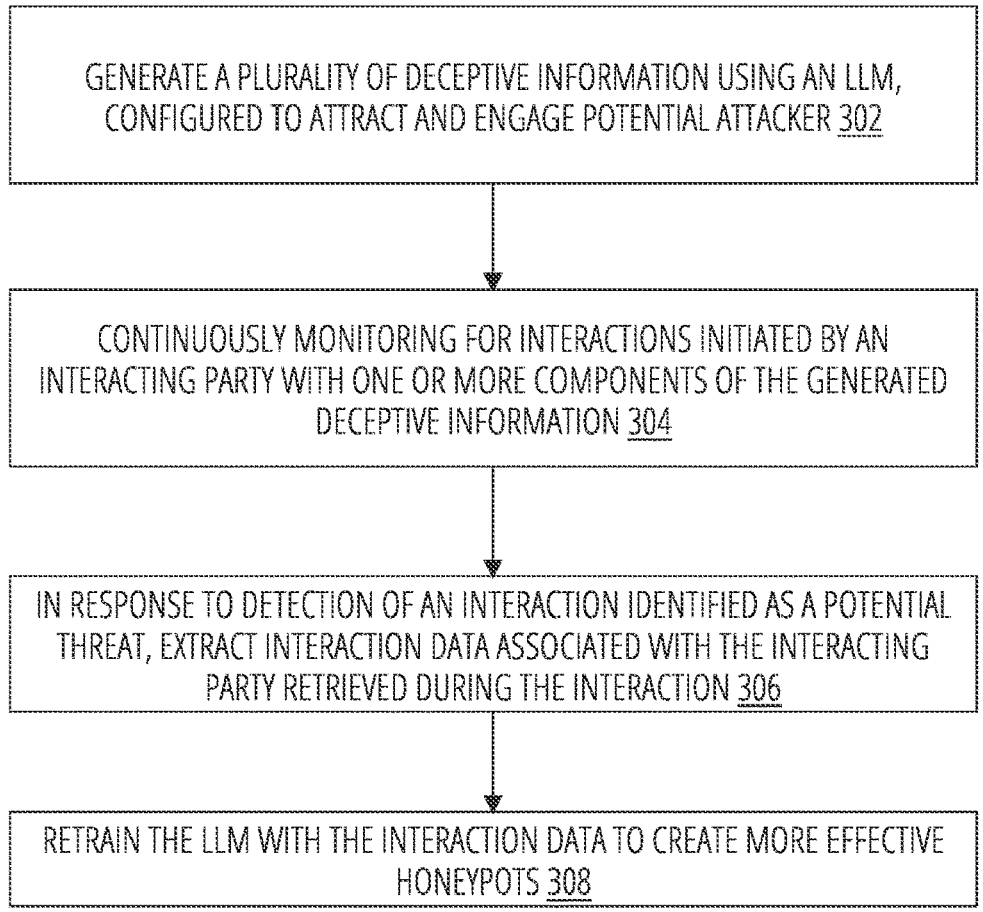
FIG. 3 illustrates a process 300 for enhancing cybersecurity using Large Language Model (LLM)-generated honeypot schemes in accordance with some embodiments of the present technology.

FIG. 3 illustrates a process 300 for enhancing cybersecurity using Large Language Model (LLM)-generated honeypot schemes in accordance with some embodiments of the present technology. Although the example process 300 depicts a particular sequence of operations, the sequence may be altered without departing from the scope of the present disclosure. For example, some of the operations depicted may be performed in parallel or in a different sequence that does not materially affect the function of the process 300. In other examples, different components of an example device or system that implements the process 300 may perform functions at substantially the same time or in a specific sequence.

At block 302, process 300 generates a plurality of deceptive information using an LLM, configured to attract and engage potential attackers. For example, the threat management service 102 illustrated in FIG. 1 may generate a plurality of deceptive information using an LLM. The LLM is configured to generate a plurality of deceptive information that is intended to attract and engage potential attackers targeting the network. The plurality of deceptive information comprises one or more characteristics referencing vulnerabilities of the network.

In some examples, the LLM-generated honeypot schemes can further include a honey pot service configured to prompt the LLM to generate the plurality of deceptive information in accordance with a predetermined script, ensuring consistency with the plurality of deceptive information. The plurality of deceptive information includes one or more fabricated user accounts, files, and administrator accounts configured to engage potential attackers.

The threat management service 102 can create Public Key Infrastructure (PKIX) certificates for servers in the network 104. These certificates can be customized by leveraging the LLM's capabilities to modify important elements like the subject and subjectAltName fields of the deceptive information metadata. Additionally, files within a user's account can be generated by incorporating the user's keywords into the file creation prompt. This ensures authenticity of the content when the potential attacker comes in contact with the file.

In some examples, deception strategies often require the creation of web and social media content that is tailored to fictitious users. The threat management service 102 can generate fabricated online personas that can either exist within the enterprise, such as in the corporate directory, or externally on various professional social media platforms like LinkedIn. The LLM can be particularly useful in this context, as it can generate diverse and contextually relevant content based on a set of associated prompts.

For example, the threat management service 102 can actively monitor network interactions, including those initiated through a chatbot. The threat management service 102 can detect an interaction from an engaging party, who is communicating with the chatbot and exhibits certain behavioral characteristics that align with known threat patterns stored in the service's extensive knowledgebase. These behavioral characteristics, combined with the fact that the predetermined threat threshold is met, trigger an alert within the threat management system, indicating that the engaging party might be a potential attacker.

In response to the threat threshold being met indicating the interaction is a potential threat, the LLM integrated into the threat management service 102 can generate a series of deceptive communications through the chatbot to attract and engage the potential attacker further to interact with generated deceptive content. These deceptive interactions can be designed to create the illusion of a vulnerable area within the network, luring the attacker toward a carefully protected, controlled environment.

As the potential attacker engages with the deceptive content, the potential attacker can be made to believe they are making progress within the network, unaware that they are actually in a protected area designed by the threat management service 102. In this controlled space, the threat management service 102 can closely analyze the attacker's behavior, tactics, and intentions. The threat management service 102 can capture valuable data related to the behavioral characteristics of the malicious activity of the potential threat, such as their methods and strategies, which can be used to better understand the attacker's motives and develop a plurality of remedial actions via the remedial action service 110.

Simultaneously, the threat management service can take steps to disengage the potential attacker from any real network vulnerabilities by isolating and limiting access to the network 104, preventing the attacker from exploiting any actual weaknesses. By employing this combination of proactive threat detection, deception, analysis, and disengagement, the threat management service effectively safeguards the network and collects valuable insights into potential threats, enhancing overall cybersecurity measures.

In some examples, process 300 can further include generating deceptive information to provide realistic HTTP responses in response to interactions initiated by the interacting party. For example, the threat management service 102 illustrated in FIG. 1 can tokenize generated deceptive information to provide realistic HTTP responses in response to interactions initiated by the interacting party.

For example, the threat management service 102 can deploy the LLM to generate deceptive information and formulate realistic HTTP responses to the engaging party, that mimic the behavior of an enterprise's legitimate web servers and applications. As the potential attacker continues their interaction, the threat management service 102 can receive HTTP requests to the enterprise's servers, seeking vulnerabilities to exploit. These requests might include suspicious queries, attempted breaches, or other malicious actions.

In response, the threat management service 102 can utilize tokenization, to create tokens or segments from the attacker's HTTP requests. The threat management service 102 can further analyze the tokens to identify patterns, keywords, or indicators of malicious interactions. Based on this analysis, the system can generate deceptive, yet plausible, HTTP responses that appear authentic to the attacker.

For example, if the attacker sends a request to access a specific financial account, the threat management service 102 can generate a realistic-looking response, providing seemingly valid account information. Unbeknownst to the attacker, this information is entirely fabricated and intentionally misleading. Accordingly, the attacker, believing they have successfully breached the network, continues to interact with the deceptive responses from the threat management service 102. All the while, the threat management service 102 closely observes the actions of the attacker and gathers crucial insights into the attacker's tactics, goals, and potential vulnerabilities intended to be exploited.

In some examples, uniform resource identifiers (URIs) can be employed to accurately emulate responses within network protocols. Accordingly, the LLM can process text in natural languages, by employing byte pair encoding tokenization, wherein the input consists of character sequences followed by a distinctive word-termination symbol.

At block 304, process 300 continuously monitors for interactions initiated by an interacting party with one or more components of the generated deceptive information. For example, the threat management service 102 illustrated in FIG. 1 may continuously monitor for interactions initiated by an interacting party with one or more components of the generated deceptive information. After identifying an interaction that could pose a threat to the network, the threat management service 102 will consistently monitor the interaction. It will then generate one or more predictions on the type of interaction that can be used to engage with the potential threat, based on one or more characteristics that reference vulnerabilities in the network.

In some examples, the process 300 further includes generating one or more contextual labels in accordance with contextual data related to the interactions to distinguish and identify threatening interactions from non-threatening interactions. For example, the threat research service 112 illustrated in FIG. 1 may generate one or more contextual labels in accordance with contextual data related to the interactions to distinguish and identify threatening interactions from non-threatening interactions. The LLM can be improved by retraining it with one or more contextual labels, which can enhance the accuracy of potential threat detection and the effectiveness of the honeypots. For instance, the threat management service 102 shown in FIG. 1 can retrain the LLM with one or more contextual labels to boost the accuracy of potential threat detection and honeypot effectiveness.

At block 306, process 300 in response to detection of an interaction identified as a potential threat, interaction data can be extracted that is associated with the interacting party retrieved during the interaction. For example, the threat intelligence service 144 illustrated in FIG. 1 may extract interaction data associated with the interacting party retrieved during the interaction. As a response to detecting an interaction that has been identified as a potential threat by the threat intelligence service 144, process 300 involves generating one or more remedial measures and policies based on the extracted interaction data to enhance network security. For example, the threat management service 102 illustrated in FIG. 1 may in response to the detection of an interaction identified as the potential threat, generate one or more remedial measures and policies for the actual network based on the extracted interaction data, enhancing network security.

For example, upon detection of the potential threat, the threat intelligence service 144 swiftly extracts interaction data associated with the engaging party involved in the interaction. The extracted interaction data can include information about the attacker's source IP address, the specific queries or actions they attempted, the patterns of their interaction, and any potential vulnerabilities they were probing.

This interaction data is then transmitted to the threat management service, which plays a crucial role in orchestrating a response. The threat management service 102 LLM can then process the extracted interaction data leveraging its vast knowledgebase 136 and sophisticated algorithms to analyze the attacker's behavior thoroughly.

Based on this analysis, the threat management service 102 generates one or more remedial measures and security policies tailored to the specific threat detected. For instance, if the attacker attempted to exploit a particular vulnerability, the threat management service 102 can recommend immediate patching of that vulnerability or modifying network configurations to block similar attack vectors. Additionally, if the attacker's behavior aligns with known attack patterns, the service might recommend adjusting intrusion detection and prevention settings or enhancing firewall rules to mitigate similar threats in the future.

These remedial measures and policies can be configured to proactively address the identified threat, strengthen network security, and prevent potential vulnerabilities from being exploited in the future. Thus, the collaboration between the threat intelligence service 144 and the threat management service 102 enables an enterprise to swiftly respond to potential threats, using the extracted interaction data to develop targeted security measures.

At block 308, process 300 retrains the LLM with the interaction data to create more effective honeypots. For example, the threat management service 102 illustrated in FIG. 1 may retrain the LLM with the interaction data to create more effective honeypots.

In some examples, process 300 further includes training the LLM by leveraging malware data stored in a storage. For example, the threat management service 102 illustrated in FIG. 1 may train the LLM by leveraging malware data stored in a storage. The LLM can then reference the malware data to identify potential threats in a network 104.

For example, the threat management service 102, in response to the detection of this potential threat at an enterprise network 104, can extract detailed interaction data gathered by the threat intelligence service. This interaction data includes information such as the attacker's behavior, the specific techniques used, the attack vectors employed, and any potential vulnerabilities targeted within the network.

With the extraction of the interaction dataset, the LLM within the threat management service 102 undergoes a retraining process. The LLM can utilize this interaction data to adapt its language generation capabilities and behavioral analysis. During retraining, the LLM can learn to recognize and understand new attack patterns and tactics exhibited by the potential attacker.

After undergoing this retraining, the LLM becomes more skilled in creating deceptive content to interact with potential attackers. As a result, the LLM can more accurately imitate the behavior of attackers, generating responses that are persuasive and genuine. This makes it more difficult for attackers to distinguish between legitimate users and deceptive elements.

In some examples, the deception system can use tactics proactively or reactively to combat potential cyber-attacks. In the proactive approach, counterfeit data is generated to mislead potential attackers, while in the reactive approach, deceptive information is created in real-time to lure attackers. To achieve this, GPT-3 prompts can be tailored to match the behavior of potential adversaries by incorporating keywords related to their previous actions. A system can be created to customize these prompts using specific keywords, which facilitates the creation of deceptive user accounts and fabricated files. These keywords include commands previously issued by the adversaries and the names of files they accessed. For example, if an attacker engages in keylogging activities, the deception system can generate deceptive content, such as an email message.

During the training phase, an HTTP message is tokenized by parsing it according to the syntactic rules of the protocol. This involves determining the boundaries of the fields and encoding end-of-field symbols using byte sequences that do not appear in the protocol syntax. Each symbol is encoded as a null byte (0x00) followed by a unique integer. This enables the encoding of 256 distinct end-of-field symbols, which enhances the system's versatility by allowing it to differentiate and model URIs independently from headers.

This tokenization technique can be applicable to any protocol, especially those that have a series of similarly encoded data elements, such as HTTP headers or STUN (Session Traversal Utilities for NAT) attributes. By tokenizing these elements, the model's capabilities can be extended from natural languages to machine protocols, similar to how GPT-3 tokenizes words.

Figure 4A:
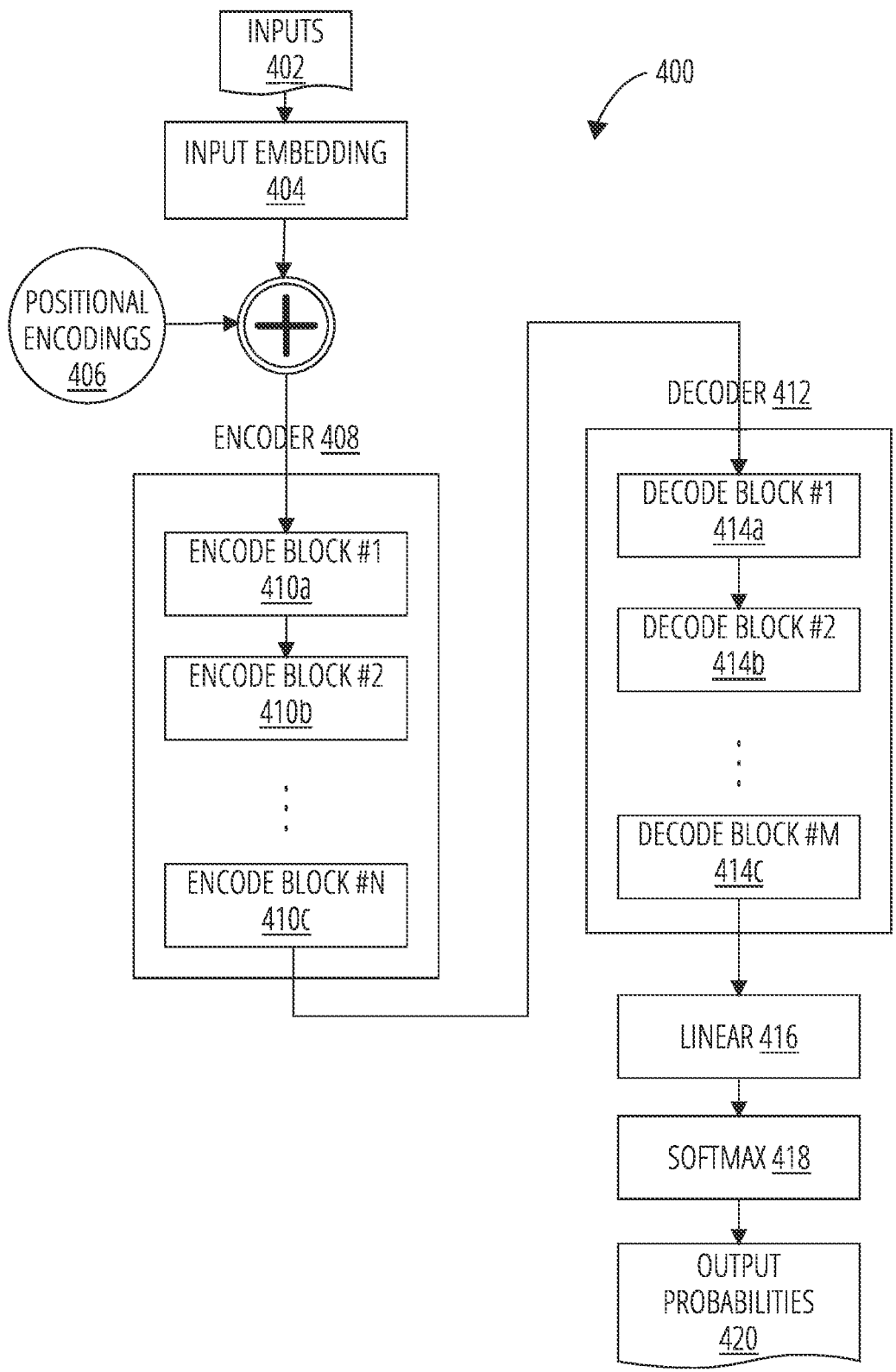
FIG. 4A illustrates a block diagram for an example of a transformer neural network architecture in accordance with some embodiments of the present technology.

FIG. 4A illustrates a block diagram for an example of a transformer neural network architecture, in accordance with certain embodiments. As discussed above, the prompt generator 230 in FIG. 2 can use a transformer architecture 400, such as a Generative Pre-trained Transformer (GPT) model. Additionally or alternatively, the prompt generator 230 can include a Bidirectional Encoder Representations from Transformers (BERT) model. According to certain non-limiting examples, the transformer architecture 400 is illustrated in FIG. 4A through FIG. 4C as including inputs 402, an input embedding block 404, positional encodings 406, an encoder 408 (e.g., encode blocks 410a, 410b, and 410c), a decoder 412 (e.g., decode blocks 414a, 414b, and 414c), a linear block 416, a softmax block 418, and output probabilities 420.

The input embedding block 404 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 404 can be learned embeddings to convert the input tokens and output tokens to vectors of dimension that have the same dimension as the positional encodings, for example.

The positional encodings 406 provide information about the relative or absolute position of the tokens in the sequence. According to certain non-limiting examples, the positional encodings 406 can be provided by adding positional encodings to the input embeddings at the inputs to the encoder 408 and decoder 412. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

Figure 4B:
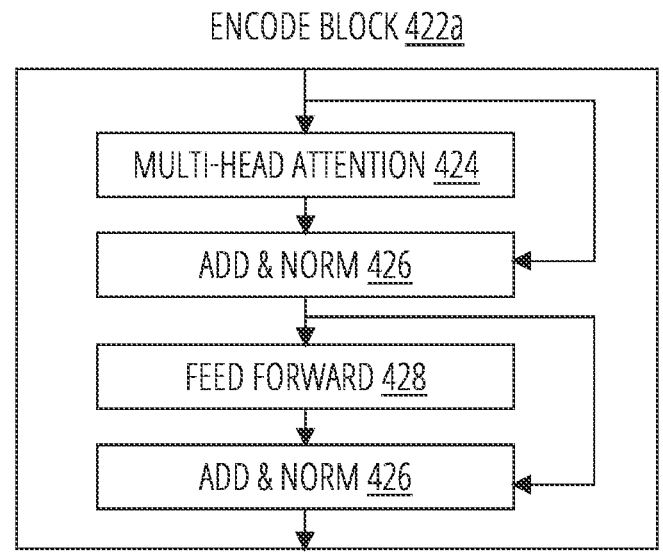
FIG. 4B illustrates a block diagram for an example of an encoder of the transformer neural network architecture in accordance with some embodiments of the present technology.
Figure 4C:
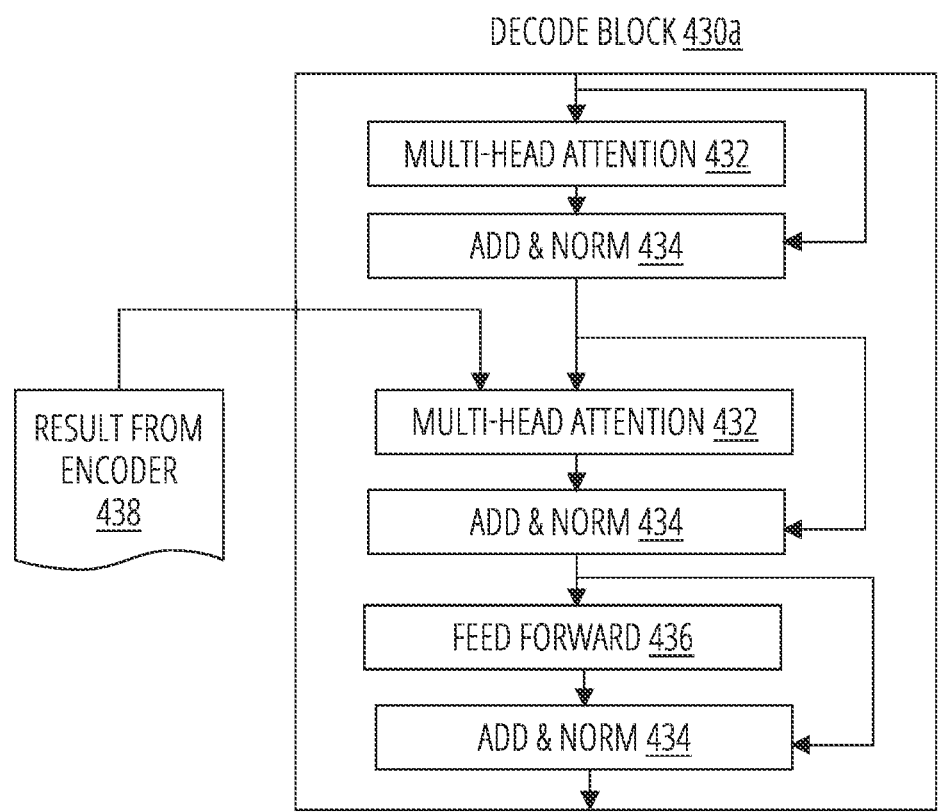
FIG. 4C illustrates a block diagram for an example of a decoder of the transformer neural network architecture in accordance with some embodiments of the present technology.

FIG. 4B illustrates a block diagram for an example of an encoder of the transformer neural network architecture, in accordance with certain embodiments.

The encoder 408 uses stacked self-attention and point-wise, fully connected layers. The encoder 408 can be a stack of N identical layers (e.g., N=6), and each layer is an encode block 410, as illustrated by encode block 410a shown in FIG. 4B. Each encode block 410 has two sub-layers: (i) a first sub-layer has a multi-head attention block 424 and (ii) a second sub-layer has a feed forward block 428, which can be a position-wise fully connected feed-forward network. The feed forward block 428 can use a rectified linear unit (ReLU).

The encoder 408 uses a residual connection around each of the two sub-layers, followed by an add & norm block 426, which performs normalization (e.g., the output of each sub-layer is LayerNorm(x+Sublayer(x)), i.e., the product of a layer normalization "LayerNorm" time the sum of the input "x" and output "Sublayer(x)" pf the sublayer Layer-Norm(x+Sublayer(x)), where Sublayer(x) is the function implemented by the sub-layer). To facilitate these residual connections, all sub-layers in the model, as well as the embedding layers, produce output data having a same dimension.

FIG. 4C illustrates a block diagram for an example of a decoder of the transformer neural network architecture, in accordance with certain embodiments.

Similar to the encoder 408, the decoder 412 uses stacked self-attention and point-wise, fully connected layers. The decoder 412 can also be a stack of M identical layers (e.g., M=6), and each layer is a decode block 414, as illustrated by decode block 414a shown in FIG. 4C. In addition to the two sub-layers (i.e., the sublayer with the multi-head attention block 424 and the sub-layer with the feed-forward block 426) found in the encode block 410a, the decode block 414a can include a third sub-layer, which performs multi-head attention over the output of the encoder stack. Similar to the encoder 408, the decoder 412 uses residual connections around each of the sub-layers, followed by layer normalization. Additionally, the sub-layer with the multi-head attention block 424 can be modified in the decoder stack to prevent positions from attending to subsequent positions. This masking, combined with fact that the output embeddings are offset by one position, ensures that the predictions for position i can depend only on the known output data at positions less than i.

The linear block 416 can be a learned linear transformation. For example, when the transformer architecture 400 is being used to translate from a first language into a second language, the linear block 416 projects the output from the last decode block 414c into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 418 then turns the scores from the linear block 416 into output probabilities 420 (which add up to 1.0). In each position, the index provides for the word with the highest probability, and then map that index to the corresponding word in the vocabulary. Those words then form the output sequence of the transformer architecture 400. The softmax operation is applied to the output from the linear block 416 to convert the raw numbers into the output probabilities 420 (e.g., token probabilities), which are used in the process of generating the summary 232 based on the prompt generator, generating the policy 228.

Figure 5A:
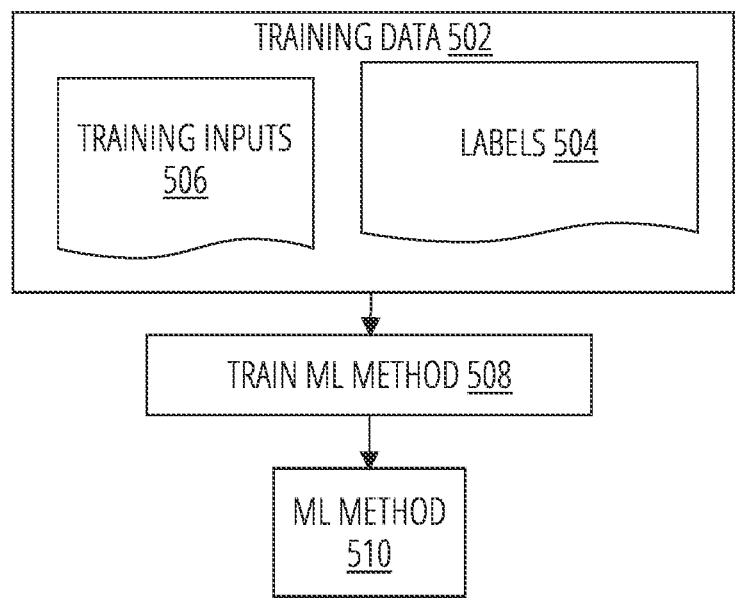
FIG. 5A illustrates a flow diagram for an example of a method of training a neural network in accordance with some embodiments of the present technology.

FIG. 5A illustrates an example of training an ML method 510 in accordance with certain embodiments. In step 508, training data 502, which includes the labels 504 and the 506) is applied to train the ML method 510. For example, the ML method 510 can be an artificial neural network (ANN) that is trained via supervised learning using a backpropagation technique to train the weighting parameters between nodes within respective layers of the ANN. In supervised learning, the training data 502 is applied as an input to the ML method 510, and an error/loss function is generated by comparing the output from the ML method 510 with the labels 504. The coefficients of the ML method 510 are iteratively updated to reduce an error/loss function. The value of the error/loss function decreases as outputs from the ML method 510 increasingly approximate the labels 504. In other words, ANN infers the mapping implied by the training data, and the error/loss function produces an error value related to the mismatch between the labels 504 and the outputs from the ML method 510 that are produced as a result of applying the training inputs 506 to the ML method 510.

For example, in certain implementations, the cost function can use the mean-squared error to minimize the average squared error. In the case of a multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of the numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods, and particle swarm optimization, can also be used for training the ML method 510.

The training ML method 508 of the ML method 510 can also include various techniques to prevent overfitting to the training data 502 and for validating the trained ML method 510. For example, bootstrapping and random sampling of the training data 502 can be used during training.

In addition to supervised learning used to initially train the ML method 510, the ML method 510 can be continuously trained while being used by using reinforcement learning based on the network measurements and the corresponding configurations used on the network. The ML method 510 can be cloud-based and trained using network measurements and the corresponding configurations from other networks that provide feedback to the cloud.

Further, other machine learning (ML) algorithms can be used for the ML method 510, and the ML method 510 is not limited to being an ANN. For example, there are many machine-learning models, and the ML method 510 can be based on machine-learning systems that include generative adversarial networks (GANs) that are trained, for example, using pairs of network measurements and their corresponding optimized configurations.

As understood by those of skill in the art, machine-learning-based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 5B:
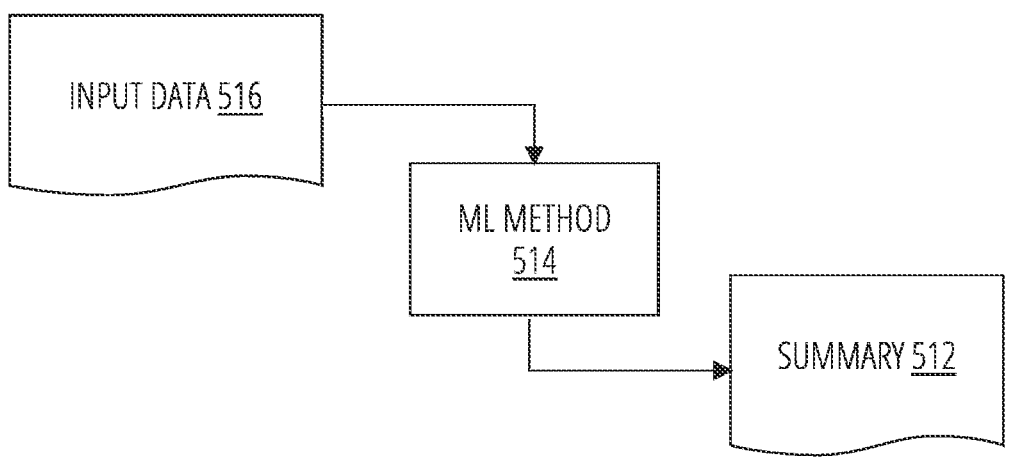
FIG. 5B illustrates a flow diagram for an example of a method of using the trained neural network in accordance with some embodiments of the present technology.

FIG. 5B illustrates an example of using the trained ML method 510. The input data 516 are applied to the trained ML method 510 to generate the outputs, which can include the summary 512.

Figure 6:
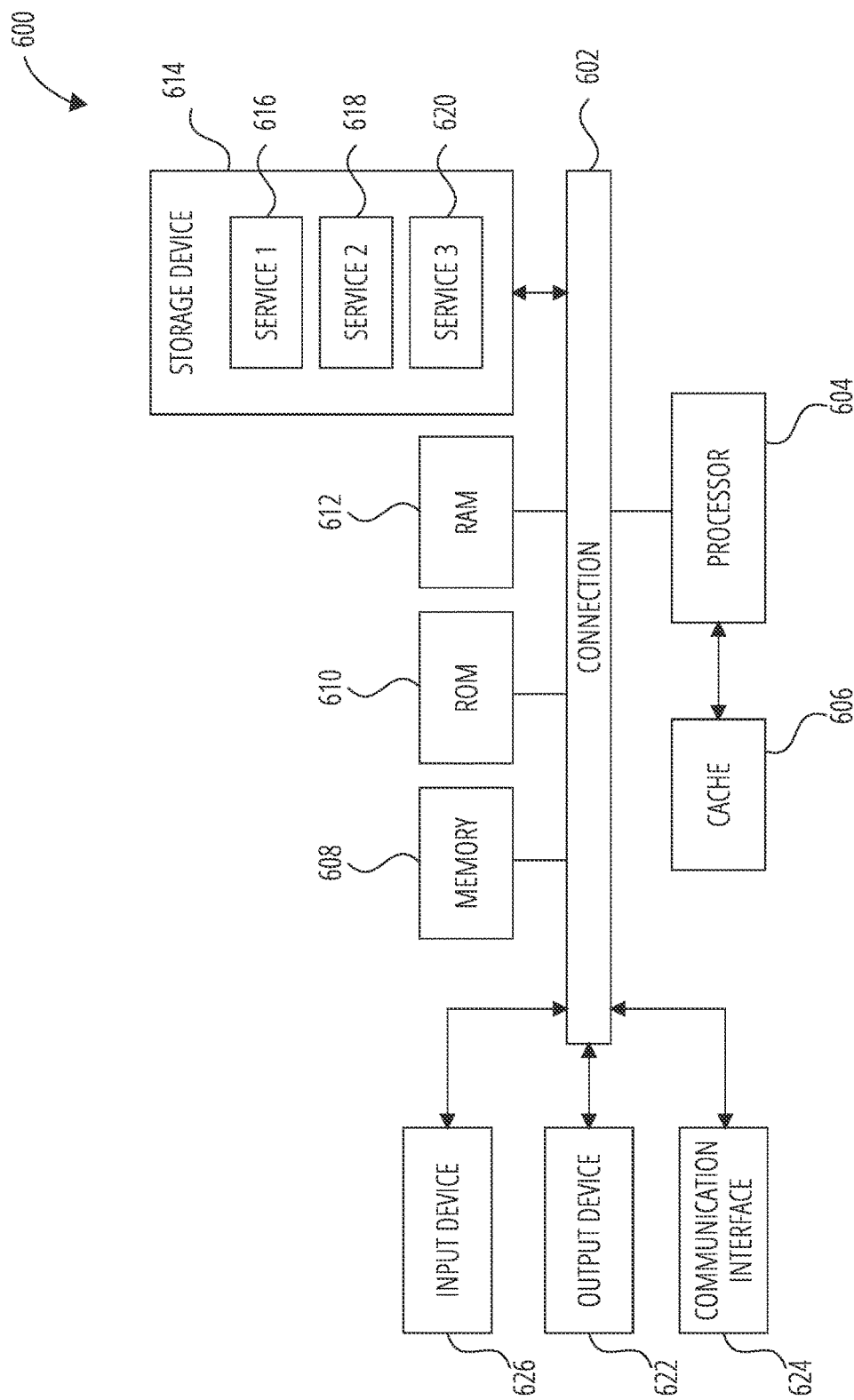
FIG. 6 illustrates a block diagram for an example of a computing device in accordance with some embodiments of the present technology.

FIG. 6 shows an example of computing system 600, which can be for example any computing device making up the system network 104 of FIG. 1, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (central processing unit (CPU) or processor) 604 and connection 602 that couples various system components including system memory 608, such as read-only memory (ROM) 610 and random access memory (RAM) RAM 612 to processor 604. Computing system 600 can include a cache of high-speed memory 608 connected directly with, in close proximity to, or integrated as part of processor 604.

Processor 604 can include any general purpose processor and a hardware service or software service, such as services 616, 618, and 620 stored in 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the hardware components, such as processor 604, connection 602, output device 622, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Aspect 1. A method comprising:

Aspect 1. A method for enhancing cybersecurity using Large Language Model (LLM)-generated honeypot schemes, the method comprising: generating a plurality of deceptive information using an LLM, configured to attract and engage potential attackers, wherein the plurality of deceptive information comprises one or more characteristics referencing vulnerabilities of a network; continuously monitoring for a first interaction initiated by an interacting party with one or more components of the generated deceptive information, wherein the first interaction is identified as a potential threat to the network; in response to detection of an interaction identified as a potential threat, extracting interaction data associated with the interacting party retrieved during the first interaction; and retraining the LLM with the interaction data to create more effective honeypots.

Aspect 2. The method of Aspect 1, wherein the LLM-generated honeypot schemes further include a honey pot service configured to prompt the LLM to generate the plurality of deceptive information in accordance with a predetermined script, ensuring consistency with the plurality deceptive information.

Aspect 3. The method of any of Aspects 1 to 2, wherein the plurality of deceptive information includes one or more fabricated user accounts, files, and administrator accounts configured to engage the potential attackers.

Aspect 4. The method of any of Aspects 1 to 3, further comprising: tokenization of generated deceptive information to provide realistic HTTP responses in response to interactions initiated by the interacting party.

Aspect 5. The method of any of Aspects 1 to 4, wherein, in response to the detection of an interaction identified as the potential threat, the method further includes: generating one or more remedial measures and policies for the network based on the extracted interaction data, enhancing network security.

Aspect 6. The method of any of Aspects 1 to 5, wherein the continuously monitoring includes generating one or more predictions of a type of interaction to engage the potential threat associated with the one or more characteristics referencing vulnerabilities of the network.

Aspect 7. The method of any of Aspects 1 to 6, wherein the continuously monitoring includes: generating one or more contextual labels in accordance with contextual data related to the interactions to distinguish and identify threatening interactions from non-threatening interactions; and retraining the LLM with the one or more contextual labels improving an accuracy level of potential threat detection and effectiveness of the honeypots.

Aspect 8. The method of any of Aspects 1 to 7, further comprising: training the LLM by leveraging malware data stored in a storage, wherein the LLM references the malware data to identify potential threats in a network.

Aspect 9. A network device comprising: one or more memories having computer-readable instructions stored therein; and one or more processors configured to execute the computer-readable instructions to: generate a plurality of deceptive information using an LLM, configured to attract and engage potential attackers, wherein the plurality of deceptive information comprises one or more characteristics referencing vulnerabilities of a network; continuously monitor for a first interaction initiated by an interacting party with one or more components of the generated deceptive information, wherein the first interaction is identified as a potential threat to the network; in response to detection of an interaction identified as a potential threat, extract interaction data associated with the interacting party retrieved during the first interaction; and retrain the LLM with the interaction data to create more effective honeypots.

Aspect 10. The network device of Aspect 9, wherein the LLM-generated honeypot schemes further include a honey pot service configured to prompt the LLM to generate the plurality of deceptive information in accordance with a predetermined script, ensuring consistency with the plurality deceptive information.

Aspect 11. The network device of any of Aspects 9 to 10, wherein the plurality of deceptive information includes one or more fabricated user accounts, files, and administrator accounts configured to engage the potential attackers.

Aspect 12. The network device of any of Aspects 9 to 11, wherein the instructions further cause the processor to: tokenize generated deceptive information to provide realistic HTTP responses in response to interactions initiated by the interacting party.

Aspect 13. The network device of any of Aspects 9 to 12, wherein in response to the detection of an interaction identified as the potential threat, the instructions further cause the processor to: generating one or more remedial measures and policies for the network based on the extracted interaction data, enhancing network security.

Aspect 14. The network device of any of Aspects 9 to 13, wherein the continuously monitoring includes: generating one or more predictions of a type of interaction to engage the potential threat associated with the one or more characteristics referencing vulnerabilities of the network.

Aspect 15. The network device of any of Aspects 9 to 14, wherein the continuously monitoring includes: generating one or more contextual labels in accordance with contextual data related to the interactions to distinguish and identify threatening interactions from non-threatening interactions; and retraining the LLM with the one or more contextual labels improving an accuracy level of potential threat detection and effectiveness of the honeypots.

Aspect 16. The network device of any of Aspects 9 to 15, wherein the instructions further cause the processor to: training the LLM by leveraging malware data stored in a storage, wherein the LLM references the malware data to identify potential threats in the network.

Aspect 17. A non-transitory computer-readable storage medium comprising computer-readable instructions, which when executed by one or more processors of a network appliance, cause the network appliance to: generate a plurality of deceptive information using an LLM, configured to attract and engage potential attackers, wherein the plurality of deceptive information comprises one or more characteristics referencing vulnerabilities of the network; continuously monitor for a first interaction initiated by an interacting party with one or more components of the generated deceptive information, wherein the first interaction is identified as a potential threat to the network; in response to detection of the first interaction identified as a potential threat, extract interaction data associated with the interacting party retrieved during the first interaction; and retrain the LLM with the interaction data to create more effective honeypots.

Aspect 18. The non-transitory computer-readable storage medium of Aspect 17, wherein the LLM-generated honeypot schemes further include a honey pot service configured to prompt the LLM to generate the plurality of deceptive information in accordance with a predetermined script, ensuring consistency with the plurality deceptive information.

Aspect 19. The non-transitory computer-readable storage medium of any of Aspects 17 to 18, wherein the plurality of deceptive information includes one or more fabricated user accounts, files, and administrator accounts configured to engage the potential attackers.

Aspect 20. The non-transitory computer-readable storage medium of any of Aspects 17 to 19, wherein the one or more processors are further configured to: tokenize generated deceptive information to provide realistic HTTP responses in response to interactions initiated by the interacting party.

Aspect 21. The non-transitory computer-readable storage medium of any of Aspects 17 to 20, wherein the one or more processors are further configured to: generate one or more remedial measures and policies for the network based on the extracted interaction data, enhancing network security.

Aspect 22. The non-transitory computer-readable storage medium of any of Aspects 17 to 21, wherein the continuously monitor includes generate one or more predictions of a type of interaction to engage the potential threat associated with the one or more characteristics referencing vulnerabilities of the network.

Aspect 23. The non-transitory computer-readable storage medium of any of Aspects 17 to 22, wherein the one or more processors are further configured to: generate one or more contextual labels in accordance with contextual data related to the interactions to distinguish and identify threatening interactions from non-threatening interactions; and retrain the LLM with the one or more contextual labels improving an accuracy level of potential threat detection and effectiveness of the honeypots.

Aspect 24. The non-transitory computer-readable storage medium of any of Aspects 17 to 23, wherein the one or more processors are further configured to: train the LLM by leveraging malware data stored in a storage, wherein the LLM references the malware data to identify potential threats in the network.

What is claimed is:

1. A method for enhancing cybersecurity using Large Language Model (LLM)-generated honeypot schemes, the method comprising:
generating a plurality of deceptive information using an LLM, configured to attract and engage potential attackers, wherein the plurality of deceptive information comprises one or more characteristics referencing vulnerabilities of a network;
continuously monitoring for a first interaction initiated by an interacting party with one or more components of the generated deceptive information, wherein the first interaction is identified as a potential threat to the network;
in response to detection of an interaction identified as the potential threat, extracting interaction data associated with the interacting party retrieved during the first interaction; and
retraining the LLM with the interaction data to create more effective honeypot schemes.

2. The method of claim 1, wherein the LLM-generated honeypot schemes further include a honey pot service configured to prompt the LLM to generate the plurality of deceptive information in accordance with a predetermined script, ensuring consistency with the plurality deceptive information.

3. The method of claim 1, wherein the plurality of deceptive information includes one or more fabricated user accounts, files, and administrator accounts configured to engage the potential attackers.

4. The method of claim 1, further comprising:
tokenization of generated deceptive information to provide realistic HTTP responses in response to interactions initiated by the interacting party.

5. The method of claim 1, wherein, in response to the detection of the interaction identified as the potential threat, the method further includes:
generating one or more remedial measures and policies for the network based on the interaction data, enhancing network security.

6. The method of claim 1, wherein the continuously monitoring includes generating one or more predictions of a type of interaction to engage the potential threat associated with the one or more characteristics referencing vulnerabilities of the network.

7. The method of claim 1, wherein the continuously monitoring includes:
generating one or more contextual labels in accordance with contextual data related to the interactions to distinguish and identify threatening interactions from non-threatening interactions; and
retraining the LLM with the one or more contextual labels improving an accuracy level of potential threat detection and effectiveness of the honeypot schemes.

8. The method of claim 1, further comprising:
training the LLM by leveraging malware data stored in a storage, wherein the LLM references the malware data to identify potential threats in the network.

9. A network device comprising:
one or more memories having computer-readable instructions stored therein; and
one or more processors configured to execute the computer-readable instructions to:
generate a plurality of deceptive information using an LLM, configured to attract and engage potential attackers, wherein the plurality of deceptive information comprises one or more characteristics referencing vulnerabilities of a network;
continuously monitor for a first interaction initiated by an interacting party with one or more components of the generated deceptive information, wherein the first interaction is identified as a potential threat to the network;
in response to detection of an interaction identified as the potential threat, extract interaction data associated with the interacting party retrieved during the first interaction; and
retrain the LLM with the interaction data to create more effective honeypot schemes.

10. The network device of claim 9, wherein the instructions further cause the one or more processors to:
tokenize generated deceptive information to provide realistic HTTP responses in response to interactions initiated by the interacting party.

11. The network device of claim 9, wherein in response to the detection of an interaction identified as the potential threat, the instructions further cause the processor to:
generating one or more remedial measures and policies for the network based on the interaction data, enhancing network security.

12. The network device of claim 9, wherein the continuously monitoring includes:
generating one or more predictions of a type of interaction to engage the potential threat associated with the one or more characteristics referencing vulnerabilities of the network.

13. The network device of claim 9, wherein the continuously monitoring includes:
generating one or more contextual labels in accordance with contextual data related to the interactions to distinguish and identify threatening interactions from non-threatening interactions; and
retraining the LLM with the one or more contextual labels improving an accuracy level of potential threat detection and effectiveness of the honeypot schemes.

14. A non-transitory computer-readable storage medium comprising computer-readable instructions, which when executed by one or more processors of a network appliance, cause the network appliance to:
generate a plurality of deceptive information using an LLM, configured to attract and engage potential attackers, wherein the plurality of deceptive information comprises one or more characteristics referencing vulnerabilities of a network;
continuously monitor for a first interaction initiated by an interacting party with one or more components of the generated deceptive information, wherein the first interaction is identified as a potential threat to the network;
in response to detection of an interaction identified as the potential threat, extract interaction data associated with the interacting party retrieved during the interaction; and
retrain the LLM with the interaction data to create more effective honeypot schemes.

15. The non-transitory computer-readable storage medium of claim 14, wherein the LLM-generated honeypot schemes further include a honey pot service configured to prompt the LLM to generate the plurality of deceptive information in accordance with a predetermined script, ensuring consistency with the plurality deceptive information.

16. The non-transitory computer-readable storage medium of claim 14, wherein the one or more processors are further configured to:
 tokenize generated deceptive information to provide realistic HTTP responses in response to interactions initiated by the interacting party.

17. The non-transitory computer-readable storage medium of claim 14, wherein the one or more processors are further configured to:
 generate one or more remedial measures and policies for the network based on the interaction data, enhancing network security.

18. The non-transitory computer-readable storage medium of claim 14, wherein the continuously monitor includes generate one or more predictions of a type of interaction to engage the potential threat associated with the one or more characteristics referencing vulnerabilities of the network.

19. The non-transitory computer-readable storage medium of claim 14, wherein the one or more processors are further configured to:
 generate one or more contextual labels in accordance with contextual data related to the interactions to distinguish and identify threatening interactions from non-threatening interactions; and
 retrain the LLM with the one or more contextual labels improving an accuracy level of potential threat detection and effectiveness of the honeypot schemes.

20. The non-transitory computer-readable storage medium of claim 14, wherein the one or more processors are further configured to:
 train the LLM by leveraging malware data stored in a storage, wherein the LLM references the malware data to identify potential threats in the network.

\* \* \* \* \*